United States Patent Office 3,739,065
Patented June 12, 1973

3,739,065
ANHYDROUS, STABLE SMALLPOX VACCINE COMPOSITION FOR PERCUTANEOUS APPLICATION AND METHOD OF PREPARING THE SAME
Bruno Mettier, Thorishaus, and Mirko Majer, Bern, Switzerland, assignors to Schweizerisches Serum- und Impfinstitut und Institut zur Erforschung der Infektions-Krankheiten, Bern, Switzerland
No Drawing. Filed Dec. 22, 1971, Ser. No. 211,095
Claims priority, application Switzerland, Jan. 4, 1971, 12/71
Int. Cl. A61k 9/06; C12k 5/00
U.S. Cl. 424—78                                                                 8 Claims

ABSTRACT OF THE DISCLOSURE

A smallpox vaccine composition which is stable for extended periods without refrigeration and ready for direct percutaneous administration is a stiff ointment essentially consisting of lyophilized vaccinia virus and polyorganosiloxane having a viscosity of 30,000 to 100,000 centistokes at 20° C. and a flow limit of more than 10, but not substantially more than 500 dynes per square centimeter. It is prepared by dispersing the lyophilized virus in a liquid polyorganosiloxane of low viscosity which is volatile at ambient temperature, mixing the dispersion so obtained with the polyorganosiloxane of the desired high viscosity, and removing the volatile liquid by evaporation in a scavenging gas or a vacuum. The ointment may be administered percutaneously without dilution or other preparation in a manner conventional in itself. It does not tend to run off the inoculated skin under the force of gravity.

---

This invention relates to smallpox vaccines and particularly to a stable smallpox vaccine composition, to its preparation, and to its use.

Smallpox vaccine compositions in current clinical use are aqueous liquids which are prepared immediately prior to administration to a patient or stored in refrigerated space because the aqueous dispersion of the live vaccinia virus employed as a vaccine lose their effectiveness at room temperature in a short time.

The aqueous vaccine compositions are fluid enough to flow from a vertical surface, such as the skin of an arm to which the vaccine is normally administered, and failure of a vaccination to take may often be attributed to run-off of the liquid from the scarified or otherwise prepared spot on the patient's skin.

It is known from U.S. Pat. No. 3,378,443 that the stability of smallpox vaccine can be greatly improved by suspending the lyophilized virus in polyorganosiloxanes, more specifically silicones which are dimethylpolysiloxanes. The efficacy and potency of the vaccine is maintained over extensive storage periods by the silicone, but its suspension characteristics are not stable, and the vaccine tends to separate out upon standing. Each dose of the vaccine must be resuspended by shaking before it can be administered to the patient. It was therefore proposed in U.S. Pat. No. 3,577,524, to mix an alochol with the vaccine prior to suspending the vaccine in the polysiloxane, and the alcohol becomes a permanent ingredient of the liquid vaccine composition acting as a suspending agent.

It has now been found that vaccine compositions consisting entirely of lyophilized smallpox vaccine and polyorganosiloxane form dispersions which do not settle out and have the known ability of such compositions of maintaining their potency without need for refrigeration, if the composition has the consistency of a paste or of a relatively stiff ointment. The compositions of the invention are free from water and other polar solvents, such as alcohols.

It has been found that the vaccine compositions of the invention, although based on polyorganosiloxanes having viscosities of 30,000 to 100,000 centistokes are fully effective when applied to a patient's skin prepared for vaccination in the conventional manner by abrading the epidermis or otherwise scarifying the skin although they are free from polar solvents. They have the additional advantage of not readily yielding to gravity when applied to the upright surface of an arm. They adhere to the skin in a small mound which may sag slightly, but does not run off and is not readily wiped off accidentally by contact with a garment, nor absorbed in the fabric of a garment by capillary forces.

Uniform dispersions of lyophilized smallpox vaccine (vaccinia virus) in polyorganosiloxanes of the high viscosities required by this invention cannot be prepared directly from the ingredients. According to the method of the invention, the lyophilized vaccine is first dispersed in a polyorganosiloxane oil of very low viscosity which is volatile at room temperature (15° to 25° C.). The vaccine, particularly when finely ground prior to contact with the oil, is readily dispersed in the very fluid oil by further grinding until the individual vaccine particles in the dispersed phase have a size much smaller than one micron.

The fluid dispersion so obtained may then be mixed readily and uniformly with a much more viscous polyorganosiloxane, and the volatile fraction is removed thereafter by evaporation in a stream of gas, such as nitrogen, which is inert to the vaccine, when the gas is passed through the viscous mixture, or by exposing the mixture to a vacuum.

Best results over the full range of atmospheric temperatures normally encountered are obtained when the polyorganosiloxane has a viscosity of at least 50,000 centistokes, and processing becomes slightly more difficult without compensating advantages if the viscosity exceeds 80,000 centistokes. The narrower range of 50,000 to 80,000 centistokes is therefore preferred. The ointments or pastes so produced are administered to the human skin in the manner usual with aqueous vaccine compositions. The skin may be prepared by abrasion or scarification prior to application of the vaccine composition, or the vaccine composition may be applied to the clean, intact skin, and the epidermis may be abraded with a needle passing through the small mound of paste. The storage life of the vaccine compositions of the invention equals that of lyophilized anhydrous vaccine at the same temperature.

It was unexpected that the practically solid polyalkylsiloxane protects the suspended vaccine against the destructive influences of atmospheric oxygen and moisture, yet does not interfere with migration of the vaccine or of its active ingredients from the interior of the paste into the skin.

The effectiveness of the vaccine composition of the invention was demonstrated in a vaccination or revaccination test on 600 human volunteers. An arm of each person was inoculated at one point with a vaccine composition of the invention which had the consistency of a stiff ointment and the size of a pin head, and at a second point with an aqueous composition prepared from lyophilized smallpox vaccine and tested for its effectiveness. The skin was uniformly scarified in both points. Special care was taken to avoid run-off of the aqueous vaccine composition. No such precautions were necessary with the vaccine composition of the invention.

The results achieved were the same in both vaccinated areas. The reactions of the same person to both types of vaccine were the same, and they varied from person to person in the usual manner.

Further comparison tests with vaccine compositions consisting of lyophilized smallpox vaccine dispersed in the volatile polyorganosiloxane referred to above showed rapid settling of the finely dispersed vaccine, and the suspension, when reconstituted by shaking immediately before application ran off the vertical skin surface even more quickly than the conventional aqueous vaccine composition with a correspondingly high percentage of failures.

It was not possible to disperse the lyophilized vaccine directly in the very viscous polyorganosiloxane to the particle size of less than one micron readily achieved in the two-step method of this invention, and an unequivocal inverse correlation could be established between the particle size of the dispersed vaccine and the percentage of takes.

The following example further illustrates the method of the invention.

EXAMPLE

The vaccinia strain Elstree was cultured on the skin of test animals, the pulpa produced was harvested, frozen at −25° C. and stored. The pulpa material was mixed with nine times its weight of McIlvain buffer (0.004 M), 0.4% phenol, and 10% trichlor-trifluoro-ethane (Freon 113), and the mixture was worked into a uniform suspension which was then homogenized. After destruction of the bacteria present, the virus supsension was centrifuged for 15 minutes at an acceleration of 1000 g.

The supernatant liquid was decanted. It contained $1 \times 10^9$ p.f.u. (plaque forming units) of vaccinia virus per ml., and was mixed with an equal volume of a 10% peptone solution.

Plasma bottles of 500 ml. capacity containing stainless steel balls of 4–16 mm. diameter were cooled to −70° C., charged each with 100 ml. of the virus-peptone mixture, and the latter was shell frozen at −70° C. The charged bottles were placed in a chamber in which the temperature was gradually permitted to rise from −50° to 0° C. over a period of 24 hours while a vacuum of 0.05 torr was maintained. During the subsequent 20 hours, the temperature was raised from 0° to +30° C. while the vacuum was set at $2 \times 10^{-5}$ torr. The bottles were then flushed with 99.99% anhydrous nitrogen and sealed with an absolutely dry, pierceable rubber disc and a screw cover.

The sealed bottles were placed for several hours on rotating rollers so that the lyophilizate was finely ground by the stainless steel balls. 25 ml. of a silicone oil volatile at ambient temperature, boiling at 97°–100° C., and having a viscosity of 0.65 centistoke were injected into each bottle from a syringe whose needle pierced the rubber disc. The silicone oil employed was a commercial product (Dow Corning 200) which was a polydimethylsiloxane of suitable molecular weight.

Rolling of the bottles was resumed, and the lyophilizate was uniformly dispersed in the silicone oil and further comminuted during the subsequent eight hours whereupon 200 ml. of a mixture of equal volumes of the aforementioned silicone oil of 0.65 centistoke and of a polydimethylsiloxane of 60,000 centistokes (Dow Corning 200) was injected into each bottle and rolling was continued for six hours.

The bottles then were emptied, and the suspension produced was separated from the steel balls. A stream of nitrogen was passed through the suspension until the volatile silicone fraction was evaporated. The residue had the consistency of a paste or stiff ointment over a temperature range from 15° to 30° C. The practically complete removal of the volatile silicone oil fraction was confirmed by weight control.

Most of the volatile silicone oil was recovered from the nitrogen stream in a cold trap for reuse. The volatile fraction could also be removed practically completely by exposing the ground dispersion to a vacuum, but only little of the volatile material could be recovered in a cold trap in the modified procedure.

The vaccine ointment was found not to satisfy Newton's law which requires the homogeneous shearing stress to be the product of the coefficient of viscosity and the rate of shear. The consistency of the vaccine composition, that is, the flow limit or yield point, was found to vary with the applied shear stress and was determined in dyne per square centimeter by the method of Eprecht [Schweiz. Archiv f. angewandte Wissenschaft und Technik, 25 (3) 1959].

The flow limit of vaccine compositions of the invention varies between not less than 10 and 500 dyne/cm.$^2$ at 20° C., and can be raised by small amounts of common, consistency-increasing materials or thickeners, such as silica comminuted to submicroscopic fineness (Aerosil, types 130, 200, 300, or 972). The effectiveness of the vaccine composition is not affected by addition of finely dispersed silica in amounts of 2% of the polyorganosiloxane, or even more, and the stability of the vaccine suspension is not significantly improved by the silica even though it may raise the consistency very substantially.

The effects of the viscosity of silicone oil in centistoke (cst.), of the presence of a thickener (Aerosil), and of the ratio of thickener to silicone oil on the flow limit and stability of the vaccine composition are listed in the following table. All listed vaccine compositions were prepared by the method of the example from uniform amounts of 5 g. vaccinia lyophilizate, all viscosity and flow limit data refer to 20° C.

TABLE

| Silicone oil | | Thick- | Flow limit, | Note |
|---|---|---|---|---|
| Cst. | Gram | ener, g. | dyne/cm.$^2$ | |
| 10,000 | 20 | | 0 | (1) |
| 12,500 | 15 | | 6 | (2) |
| | 30 | 0.7 | 180 | (2) |
| | 15 | 0.7 | 330 | (2) |
| 20,000 | 20 | 0.1 | 0–10 | (2) |
| 30,000 | 15 | | 12 | (3) |
| | 30 | 0.7 | 280 | (3) |
| | 15 | 0.7 | 480 | (3) |
| 60,000 | 20 | | 20 | (4) |
| | 40 | 0.3 | 200 | (4) |
| | 20 | 0.3 | 330 | (4) |
| | 20 | 0.5 | 500 | (4) |
| 80,000 | 15 | | 32 | (4 5) |
| | 30 | 0.7 | 325 | (4 5) |
| 100,000 | 15 | | 40 | (4) |
| | 30 | 0.3 | 110 | (4) |
| | 30 | 0.7 | 390 | (4) |
| | 15 | 0.7 | 660 | (4 6) |

$^1$ Not an ointment, but a Newtonian liquid.
$^2$ Semi-liquid, unstable mass from which the lyophilizate settles in storage. Not suitable for direct administration.
$^3$ Flow limit and other properties are not precisely reproducible and change during storage. Reliably suitable for vaccination only when freshly prepared.
$^4$ Paste suitable for direct administration to prepared skin of the patient. No separation, no change of physical properties in storage.
$^5$ The silicone oil of 80,000 centistokes was prepared by mixing oil fo 60,000 and 100,000 centistokes in equal volumes.
$^6$ Did not adhere to skin unless applied very carefully. The percentage of takes was significantly lower than at 500 dynes per cm.$^2$.

The vaccine composition prepared by the method of the example from lyophilized vaccinia virus and silicone oil having a viscosity of 60,000 centistokes, without thickener, and having a flow limit of 20 dynes per cm.$^2$ was found to have a titer of $2.4 \times 10^8$ p.f.u./g. when freshly prepared. An aliquot of an anhydrous, lyophilized smallpox vaccine was dispersed in a measured amount of water, and the freshly prepared aqueous vaccine composition had a titer of $4.5 \times 10^8$ p.f.u./ml.

The vaccine composition of the invention and the lyophilized vaccine were stored at 37° C. for four weeks, and their titers were then again determined. That of the paste vaccine had dropped to $4.9 \times 10^7$ p.f.u./g., or to 20.4% of the original value. Aqueous vaccine freshly prepared from the stored, anhydrous lyophilizate with the same amount of water as in the initial test dropped to a titer of $9.0 \times 10^7$ p.f.u./ml. or 20.0%. For comparison purposes, a sealed vial of an aqueous vaccine preparation certified effective by Swiss health authorities was stored under the same conditions, and dropped from $1.0 \times 10^8$ to $1.0 \times 10^2$ p.f.u./ml. or to 0.0001% of its initial potency, thereby becoming entirely ineffective.

The titers of the several tested vaccine compositions were determined in the usual manner on the Chorio allantois membrane. The vaccine pastes of the invention are not suitable for direct titration, but had to be diluted first with the silicone oil of 0.65 centistoke viscosity to permit extraction with McIlvain buffer (0.04 M), whereupon the aqueous phase was further diluted and tested.

For testing the effectiveness of the vaccine paste or ointment of the invention, 5 cm.$^2$ fields of live rabbit skin were scarified and inoculated with respective 100 mg. batches of the composition prepared in the example and of portions thereof diluted with the low-viscosity silicone oil (0.65 centstoke) to 10%, 1%, 0.1% and 0.01%. The inoculated fields were inspected after five days. Multiple pustules formed and coalesced at vaccine concentrations down to 0.1%, and a single pustula formed at 0.01%.

The same vaccine composition was employed in the tests on 600 volunteers mentioned above and illustrates the equivalency of the compositions of the invention with the product now in successful clinical use on a large scale, when the latter is employed under carefully controlled conditions.

When the vaccinia strain Elstree was replaced in the procedure of the example by the strains Berne, New York, or EM 53, the vaccine compositions obtained had the same storage life and effectiveness, and no other differences were observed.

The concentration of the active ingredient in the vaccine compositions of the invention may be chosen at will, and will normally be determined by the health laws of the country or other administrative unit where the vaccine is to be employed. A concentration of $2\times10^7$ to $2\times10^8$ p.f.u./g. in aqueous compositions has been reported to provide a take rate of 80% in revaccination, the exact required minimum concentration depending on the period elapsed since the last previous vaccination (Polak "Problems with Smallpox Vaccines and Possible Solution," First International Conference on Vaccines against Viral and Rickettsial Diseases in Man, Washington, 1966). Data available so far indicate that the vaccine compositions of the invention produce a positive reaction in 90% of all revaccinated persons at a concentration of $1\times10^7$ p.f.u./g., and that the same concentration is 100% successful in primary vaccination.

Except as stated specifically above, the storage life and effectiveness of the vaccine was not significantly affected when the viscosity of the polydimethylsiloxane was varied between 30,000 and 100,000 centistokes at 20° C., nor when the flow limit or yield point varied between slightly more than 10 and 500 dynes per square centimeter at 20° C. The choice of a specific viscosity and flow limit within these ranges will be controlled mainly by the climate in which the vaccine composition is to be employed, the higher values being preferred in tropical or other hot climates for obvious reasons.

The smallpox vaccine compositions of the invention thus provide the known good storage life of vaccine dispersions in polyorganosiloxanes with the ability of direct application to the patient's skin without any preparatory steps performed on the composition. They essentially consist of the lyophilized smallpox vaccine and the polyorganosiloxane without any dispersing agent, and rely on the high viscosity of the polyorganosiloxane base and the fine dispersion of the vaccine solids for stability of the dispersion without requiring the presence of a polar solvent as a dispersing or stabilizing agent. They adhere to the skin and do not tend to run off from a vertical skin surface. This property may be enhanced by a small amount of thickener, but the thickener affects neither the effectiveness of the vaccine nor the stability of the dispersion. At flow limits or yield points significantly higher than 500 dynes per square centimeter, the adhesive properties and the effectiveness of the vaccine composition are impaired regardless of the manner in which the high flow limit is achieved. Stable dispersions cannot be achieved at viscosities of less than 30,000 centistokes in the polyorganosiloxane base, nor with dispersions having a flow limit of about ten dynes per square centimeter or less.

While the invention has been described with particular reference to specific embodiments, it is to be understood that it is not limited thereto, but is to be construed broadly and restricted solely by the scope of the appended claims.

What is claimed is:

1. A smallpox vaccine composition essentially consisting of:
   (a) polyorganosiloxane; and
   (b) lyophilized smallpox vaccine uniformly dispersed in said polyorganosiloxane,
      (1) said polyorganosiloxane having a viscosity of 30,000 to 100,000 centistokes at 20° C.,
      (2) the composition having the consistency of an ointment at 15° to 25° C., and being free of polar solvent,
      (3) the flow limit of said ointment being greater than 10 dynes per square centimeter, but not substantially greater than 500 dynes per square centimeter at 20° C.

2. A composition as set forth in claim 1, wherein said polyorganosiloxane is polydimethylsiloxane.

3. A composition as set forth in claim 2, wherein said viscosity is 50,000 to 80,000 centistokes.

4. A composition as set forth in claim 2, wherein the particle size of said dispersed lyophilized vaccine is substantially smaller than one micron.

5. A method of preparing a smallpox vaccine composition having the consistency of an ointment at 15° to 25° C. which comprises:
   (a) intimately mixing comminuted, lyophilized vaccinia virus with a liquid polydimethylsiloxane volatile at 20° C. until a uniform dispersion of said virus in said polydimethylsiloxane is formed;
   (b) mixing said dispersion with a polydimethylsiloxane having a viscosity of 30,000 to 100,000 centistokes at 20° C. until an intimate mixture of said virus, said volatile polydimethylsiloxane, and said polydimethylsiloxane having said viscosity is formed; and
   (c) removing said volatile polydimethylsiloxane from said mixture by evaporation.

6. A method as set forth in claim 5, wherein said volatile polydimethylsiloxane is removed from said mixture by passing a stream of a gas inert to said virus and to said polydimethylsiloxane of said viscosity through said mixture.

7. A method as set forth in claim 5, wherein said volatile polydimethylsiloxane is removed from said mixture by exposing said mixture to a vacuum.

8. A method of vaccinating a patient which comprises applying an amount of the composition of claim 1 to a portion of the skin of said patient, and scarifying said portion, said amount being sufficient to produce immunity to smallpox.

No references cited.

RICHARD L. HUFF, Primary Examiner

U.S. Cl. X.R.

424—89, 184